US008870101B2

(12) United States Patent
Gibson et al.

(10) Patent No.: US 8,870,101 B2
(45) Date of Patent: Oct. 28, 2014

(54) COMBINATION MATERIAL DEFLECTOR AND DOOR SEAL FOR A MATERIAL SPREADER

(75) Inventors: Todd Gibson, Brodhead, WI (US); George Cicci, Fitchburg, WI (US); Patrick Henry, Monroe, WI (US)

(73) Assignee: Kuhn North America, Inc., Brodhead, WI (US)

( * ) Notice: Subject to any disclaimer, the term of this patent is extended or adjusted under 35 U.S.C. 154(b) by 541 days.

(21) Appl. No.: 12/892,430

(22) Filed: Sep. 28, 2010

(65) Prior Publication Data

US 2012/0074240 A1    Mar. 29, 2012

(51) Int. Cl.
| | | |
|---|---|---|
| A01C 19/00 | (2006.01) | |
| A01C 3/06 | (2006.01) | |
| E01C 19/20 | (2006.01) | |

(52) U.S. Cl.
CPC .............. *A01C 3/06* (2013.01); *E01C 19/2025* (2013.01)
USPC .......................................... 239/676; 239/674

(58) Field of Classification Search
CPC ............. B05D 1/24; B05D 1/30; B05B 1/326
USPC .......... 239/676, 650, 668, 674; 222/166, 196, 222/198, 199
See application file for complete search history.

(56) References Cited

U.S. PATENT DOCUMENTS

| | | | | |
|---|---|---|---|---|
| 4,072,272 A | * | 2/1978 | Harder | 239/676 |
| 4,469,210 A | * | 9/1984 | Blumer et al. | 193/22 |
| 4,770,348 A | | 9/1988 | Rieke | |
| 5,340,033 A | * | 8/1994 | Whitell | 239/676 |
| 5,356,054 A | | 10/1994 | Loppoli et al. | |
| 5,890,867 A | * | 4/1999 | Hagemeyer | 414/519 |
| 5,927,617 A | * | 7/1999 | Musso et al. | 239/657 |
| 5,967,427 A | * | 10/1999 | Seymour | 239/676 |
| 6,419,418 B1 | * | 7/2002 | Smith | 404/101 |
| 6,502,771 B1 | * | 1/2003 | Wyne | 239/663 |

FOREIGN PATENT DOCUMENTS

| | | |
|---|---|---|
| FR | 2 618 633 A1 | 2/1989 |
| JP | 2005-192520 | 7/2005 |

OTHER PUBLICATIONS

United Kingdom Search Report issued Jan. 13, 2012, in Patent Application No. GB 1115995.1.

* cited by examiner

*Primary Examiner* — Davis Hwu
(74) *Attorney, Agent, or Firm* — Oblon, Spivak, McClelland, Maier & Neustadt, L.L.P.

(57) ABSTRACT

A spreading apparatus for spreading material onto a target area is disclosed. The spreading apparatus includes a container for the material, a discharge unit which discharges the material, a deflector door disposed on a discharge port of the discharge unit, a positioning device which positions the deflector door and a controller configured to control the deflector door so that the deflector door is positioned between a first closed position and a second open position. The material is substantially prevented from exiting through the discharge port when the deflector door is in the first position. The deflector door may further be positioned at a position between the first closed position and second open position to control a distance of the material discharged from the discharge port.

15 Claims, 11 Drawing Sheets

COMBINATION MATERIAL DEFLECTOR AND DOOR SEAL FOR A MATERIAL SPREADER

BACKGROUND OF THE INVENTION

1. Field of the Invention

This invention relates to a spreader apparatus for spreading, among other materials, manure, compost, cut crop material, sand, municipal waste, fish food, or the like.

2. Description of the Related Art

Many mechanical arrangements have been devised for spreading material such as manure. A typical spreader apparatus includes a container having an opening for the reception therein of the material and an outlet for a discharge therethrough of the material to be spread on the desired area.

In some conventional apparatuses, the spreader apparatus includes a material deflector that is provided near the discharge outlet to control the spread pattern and point of deposition of the material to be spread.

However, the spreader apparatus typically has to travel to and from the location where the material is spread. For example, the spreading apparatus may have to travel over a roadway to get to the field. After the material has been spread by the spreading apparatus, some of the material may cling to a discharge system of the spreading apparatus. In some conventional apparatuses, it is possible that the material clinging to the discharge system on the spreader may fall off the machine during traveling. In particular, material clinging to a discharge unit of the spreader apparatus may exit through a discharge port when the spreader apparatus is not in operation, i.e., during traveling. In addition, material clinging to the material deflector may also fall off during traveling. There may be adverse consequences if the material in the discharge system of the spreader apparatus were to exit the spreader apparatus into the surrounding environment, such as a roadway, when the spreading apparatus is not in operation.

SUMMARY OF THE INVENTION

Accordingly, one aspect of the present invention is to provide accurate control of the distance traveled and the spread pattern of the material discharged by the spreader apparatus.

Another aspect of the present invention is to prevent or reduce the unwanted discharge of material from the spreading apparatus, especially during traveling of the spreader apparatus to the desired location.

One non-limiting embodiment of the present invention can provide a container for the material, a discharge unit which discharges the material, a deflector door disposed on a discharge port of the discharge unit, a positioning device which positions the deflector door and a controller configured to control the deflector door so that the deflector door is positioned at a position of a user's choosing between a first closed position and a second open position. The deflector door substantially covers the discharge port when the deflector door is in the first position such that the material is substantially prevented from exiting through the discharge port.

In another non-limiting embodiment of the present invention, the deflector door includes a first portion and a second portion, the second portion extending from an end of the first portion at a non-zero angle.

In another non-limiting embodiment of the present invention, the deflector door includes a lip which cooperates with a seal member on the discharge port to create a seal when the deflector door is in the first closed position. The lip of the deflector door may be beveled.

In another non-limiting embodiment of the present invention, the deflector door positioning device is a linear actuator. The linear actuator may be a hydraulic cylinder. The hydraulic cylinder may include a rod and a piston. The rod is connected to the deflector door. The deflector door is in the first closed position when the hydraulic cylinder is completely extended such that the deflector door substantially covers the discharge port. The deflector door is in the second maximum open position when the hydraulic cylinder is completely retracted such that material discharged from the discharge unit does not impact the deflector door.

In another non-limiting embodiment, the spreading apparatus includes a primary door disposed in the discharge unit between the outlet of the container and the inlet port of the discharge unit. A hydraulic cylinder may actuate the primary door between an open and closed position.

In another non-limiting embodiment, the controller is configured to control an amount by which the material discharged from the discharge port is deflected by the deflector door when the deflector door is positioned between the first position and the second position.

In another non-limiting embodiment, the discharge unit includes a discharging device disposed inside the housing which discharges the material through the discharge port.

In another non-limiting embodiment, the deflector door completely covers the discharge port when the deflector door is in the first position such that the material is prevented from exiting through the discharge port.

A method of spreading material includes discharging material from a spreading apparatus, deflecting the discharged material with a deflector door such that a distance that the material is discharged is based on a position of the deflector door, and covering a discharge port of the spreader apparatus with the deflector door such that material is substantially prevented from exiting through the discharge port.

In another non-limiting method, a lip of the deflector door cooperates with a seal member on the discharge port to create a seal when the deflector door covers the discharge port.

In another non-limiting method, the deflector door includes a first portion and a second portion, a first end of the first portion is pivotably connected to the discharge port, a second end of the first portion is connected to a first end of the second portion of the deflector door such that the second portion extends from the second end of the first portion at a non-zero angle.

BRIEF DESCRIPTION OF THE DRAWINGS

These and other advantages of the invention will become more apparent and more readily appreciated from the following detailed description of the exemplary embodiments of the invention taken in conjunction with the accompanying drawings where.

DETAILED DESCRIPTION OF THE PREFERRED EMBODIMENTS

With reference to FIGS. 1, 2, 3A and 3B, one example of a spreader apparatus 1 for spreading material onto a target area is shown. The spreader apparatus 1 includes a container 10 and a discharge unit 20 that discharges the material onto a target area. In the depicted non-limiting example, the discharge unit 20 is provided at a side of the container 10. The material that is spread may include, for example, manure, compost, sand, municipal waste and fish food. However, other materials are possible.

The container 10 includes a floor 12, a sidewall 14, an open upper end 16 which receives the material and an outlet 18 through which the material from the container 10 moves to the discharge unit 20. Augers 13a, 13b disposed in the container 10 move the material from the container 10 to the discharge unit 20.

Figure 1:
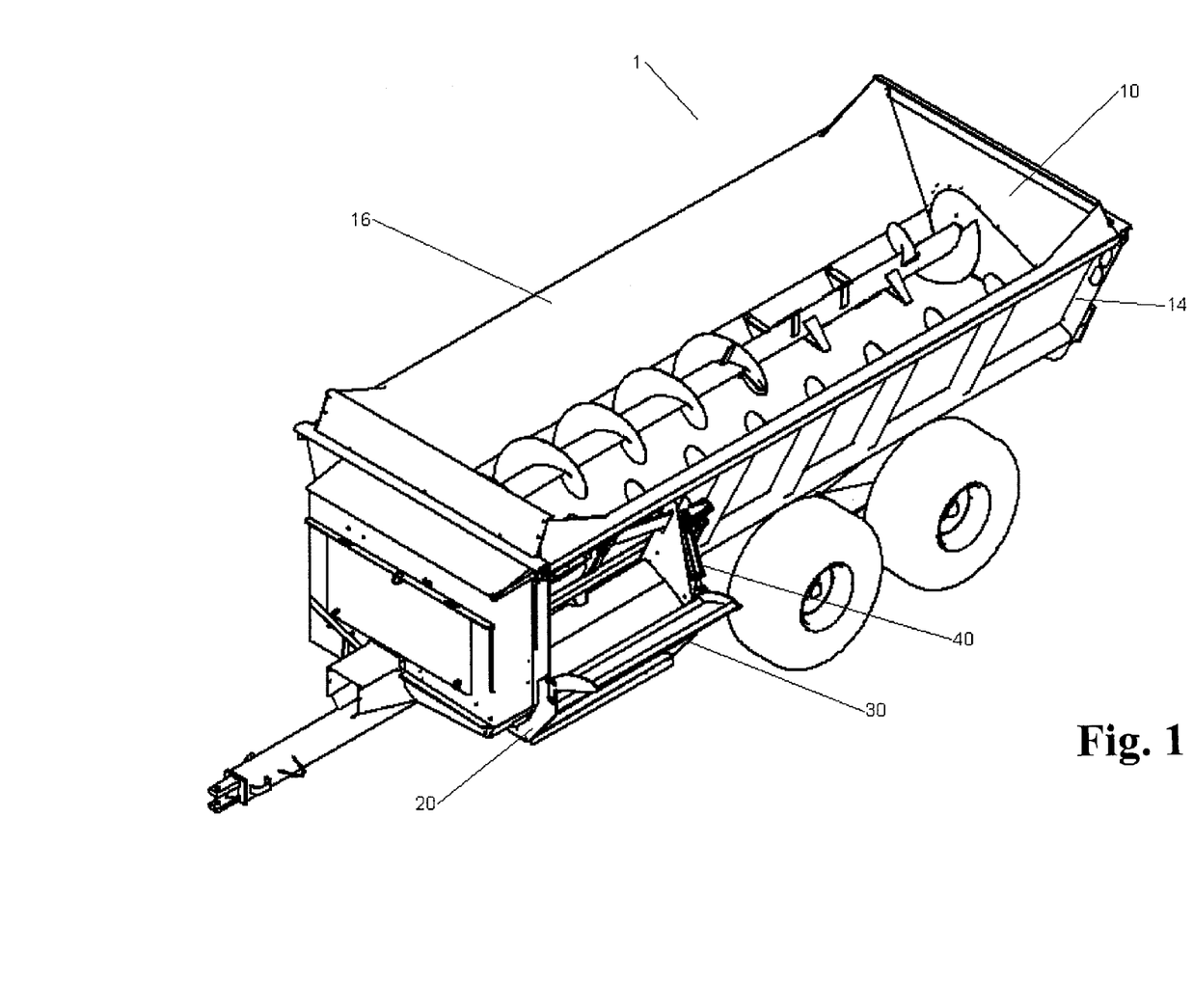
FIG. 1 is an isometric view of one example of the spreader apparatus.
Figure 6:
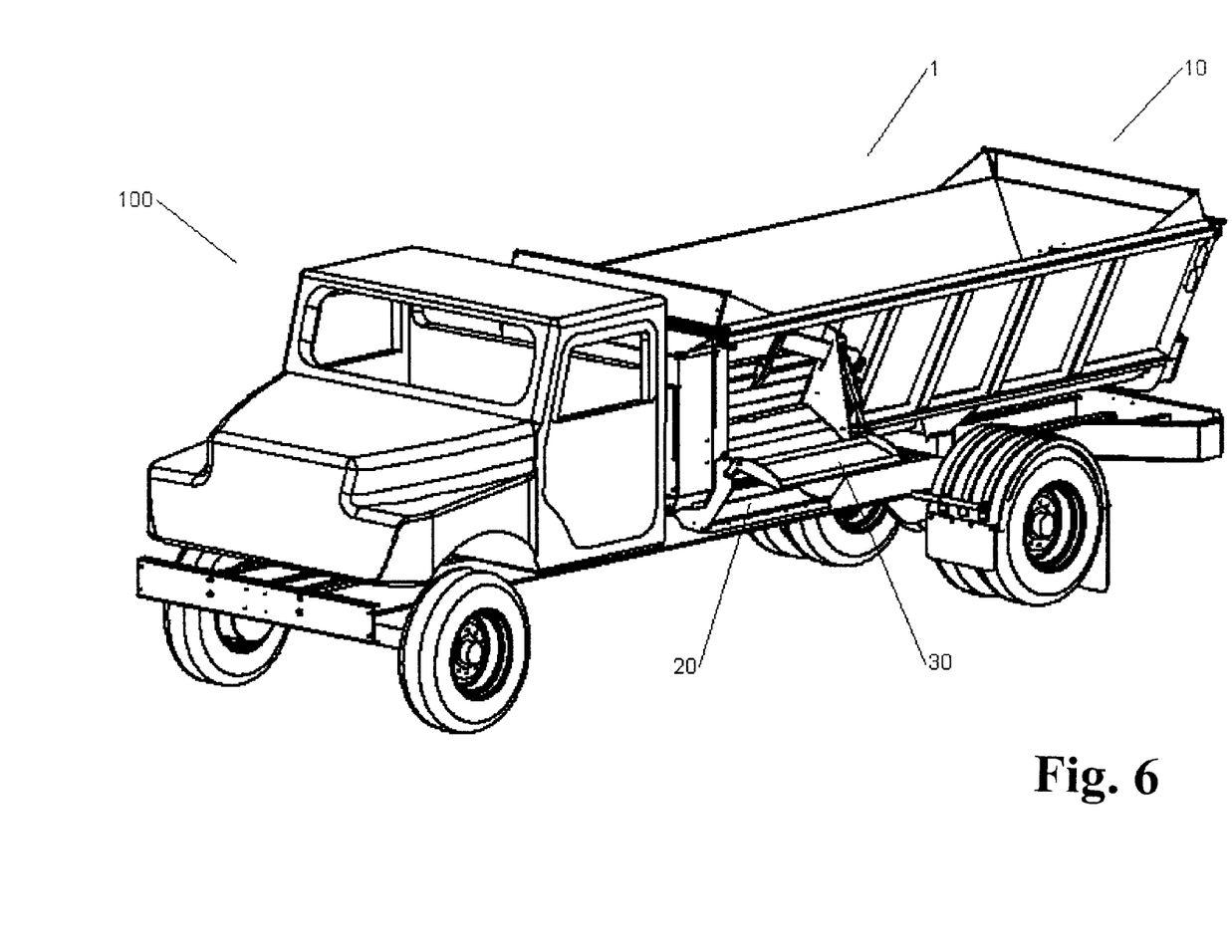
FIG. 6 is an isometric view of another example of the spreader apparatus.

The spreader apparatus 1 shown in FIG. 1 is pulled by a tractor as a trailer. In an alternate embodiment shown in FIG. 6, the spreader apparatus 1 is instead arranged on a truck 100, for example, within or as a substitute for the box of the truck 100.

The discharge unit 20, disposed adjacent to the outlet 18, includes a housing 21 with an inlet port 22 and a discharge port 23. The material flows from the inlet port 22 to the discharge port 23. A discharging device 24 is disposed in the discharge unit 20 which discharges the material out of the discharge port 23. The discharging device 24 includes a plurality of hammers 24a, 24b, 24c, 24d, 24e, 24f. The arrangement is such that when the spreader apparatus is being used to spread material, the material moves from the container 10 through the outlet 18 and the inlet port 22, towards the discharging device 24 and exits the discharge port 23.

Figure 3A:
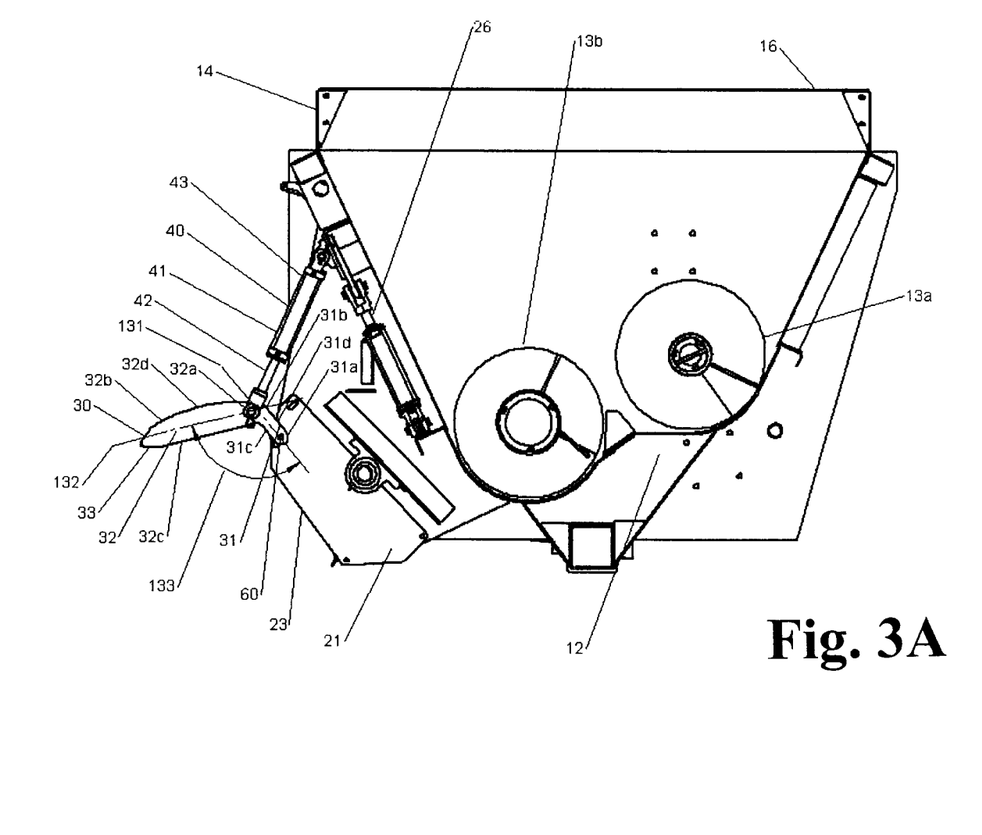
FIG. 3A is a cross section view of the spreader apparatus.
Figure 3B:
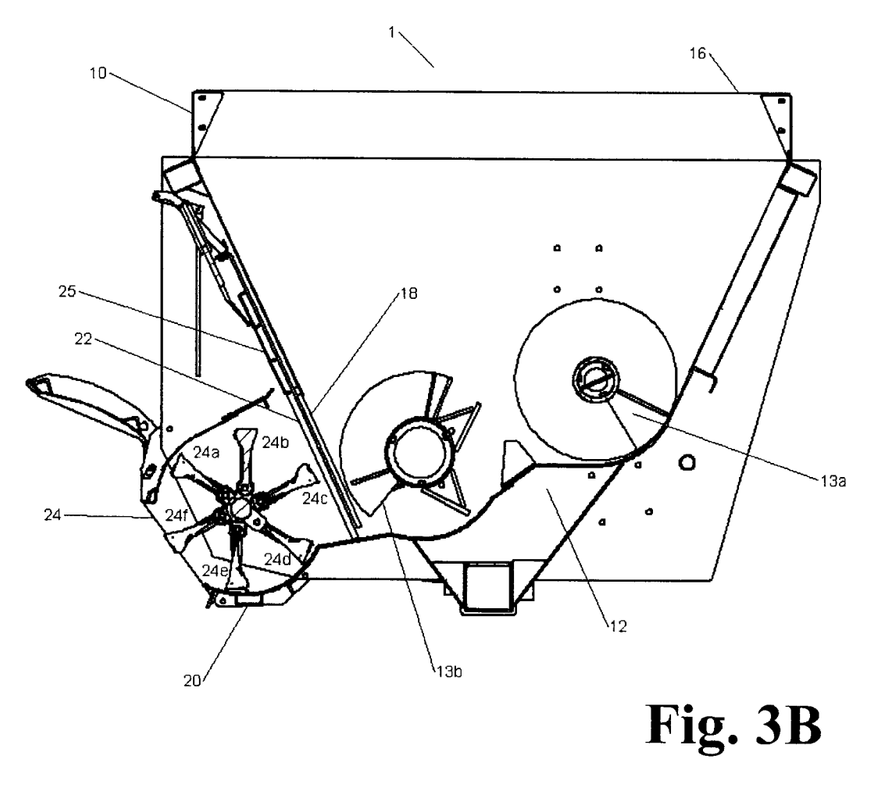
FIG. 3B is another cross section view of the spreader apparatus.

A primary door 25 is disposed between the outlet 18 of the container 10 and the inlet port 22 of the discharge unit 20. The primary door 25 moves between open and closed positions. A primary door positioning device 26 is used to control movement of the primary door 25 between the open position, the closed position, and any position therebetween. The amount of material that enters the discharge unit 20 is controlled by the position of the primary door 25. The primary door positioning device 26 may be a hydraulic cylinder, for example. The primary door positioning device 26 may be disposed on the exterior of the sidewall 14 of the container 10.

The bottom of the discharge port 23 typically includes a seal member 27. The seal member 27 may be covered with a rubber strip 27a.

Figure 2:
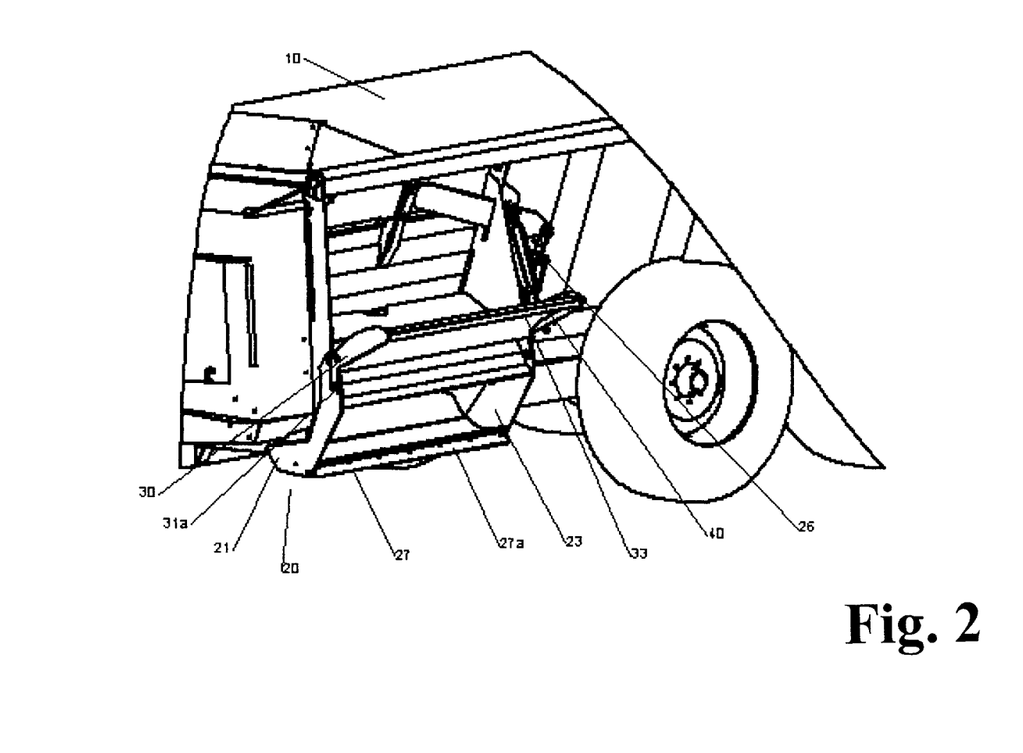
FIG. 2 is a detailed view of the discharge unit of the spreader apparatus with the deflector door in a second position.

In the depicted example, a deflector door 30 is connected to the discharge port 23 via a pivot 60. A deflector door positioning device 40 is connected to the deflector door 30. The depicted deflector door 30 is a unitary construction, i.e., single piece unit, that includes a first portion 31 and a second portion 32. The first portion 31 of the deflector door 30 extends along a first plane 131 and the second portion 32 of the deflector door 30 extends along a second plane 132. An angle 133 between the first plane 131 and the second plane 132 is non-zero.

A first end 31a of the first portion may be pivotably connected to the housing 21 of the discharge unit 20 and a second end 31b of the first portion 31 may be connected to the deflector door positioning device 40. The pivot 60 connects the discharge port 23 to the first end 31a of the first portion of the deflector door 30.

A first end 32a of the second portion 32 of the deflector door 30 is connected to the second end 31b of the first portion 31 of the deflector door. The second portion 32 of the deflector door 30 extends from the first end 32a to a second free end 32b. A lip 33 may be provided at the second end 32b of the second portion 32 of the deflector door 30. The lip 33 may be beveled to increase the strength of the deflector door 30. The second portion 32 of the deflector door 30 includes an inner side 32c and an outer side 32d. The inner side 32c of the second portion 32 may be substantially planar and the outer side 32d of the second portion 32 may be curved. An angle 133a between an inner side 31c of the first portion 31 and the inner side 32c of the second portion 32 may be greater than zero. Similarly, an angle 133b between an outer side 31d of the first portion 31 and the outer side 32d of the second portion 32 may be greater than zero.

The deflector door positioning device 40 may be a linear actuator such as a pneumatic cylinder or a hydraulic cylinder, preferably a hydraulic cylinder. One non-limiting example of the deflector door positioning device 40 is the hydraulic cylinder 41. The hydraulic cylinder includes a rod 42 and a piston 43. The piston 43 is connected to the rod 42 and moves relative to the exterior of the sidewall 14 of the container 10. The rod 42 may be connected to the deflector door 30 at the second end 31b of the first portion 31 at a joint 50. One non-limiting example of the connection between the deflector door positioning device 40 and the second end 31b of the first portion 31 is a pin 51.

A controller (not shown) controls the extension and retraction of the hydraulic cylinder 41. The deflector door 30 rotates about the pivot 60 as the hydraulic cylinder 41 extends and retracts. Accordingly, the position of the deflector door 30 is determined based on the extension and retraction of the hydraulic cylinder 41.

In the depicted example shown in FIG. 1, the controller may be a pump that is mounted to the tractor that pulls the trailer with the spreading apparatus 1. A remote control lever may be placed in the cab of the tractor to control the position of the deflector door 30. In the depicted example shown in FIG. 6, the controller may be a hydraulic pump which is connected to the transmission of the truck. Switches may be placed in the cab of the truck to control the position of the deflector door 30.

Figure 4A:
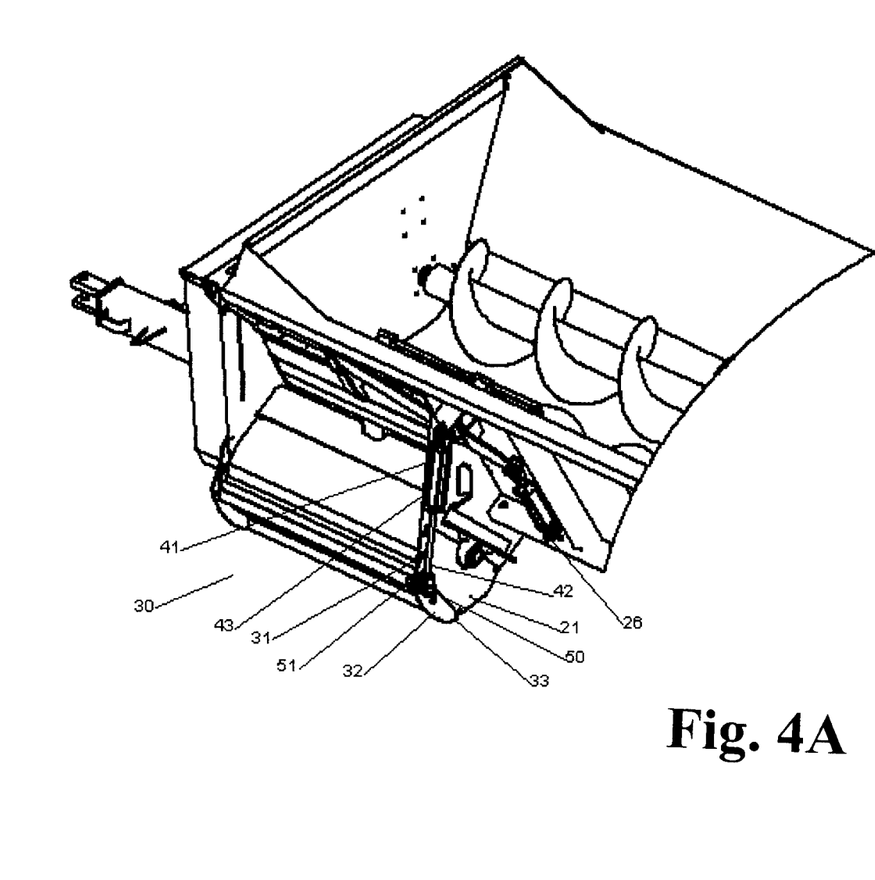
FIG. 4A is an isometric view of the spreader apparatus with the deflector door in the first position.
Figure 4B:
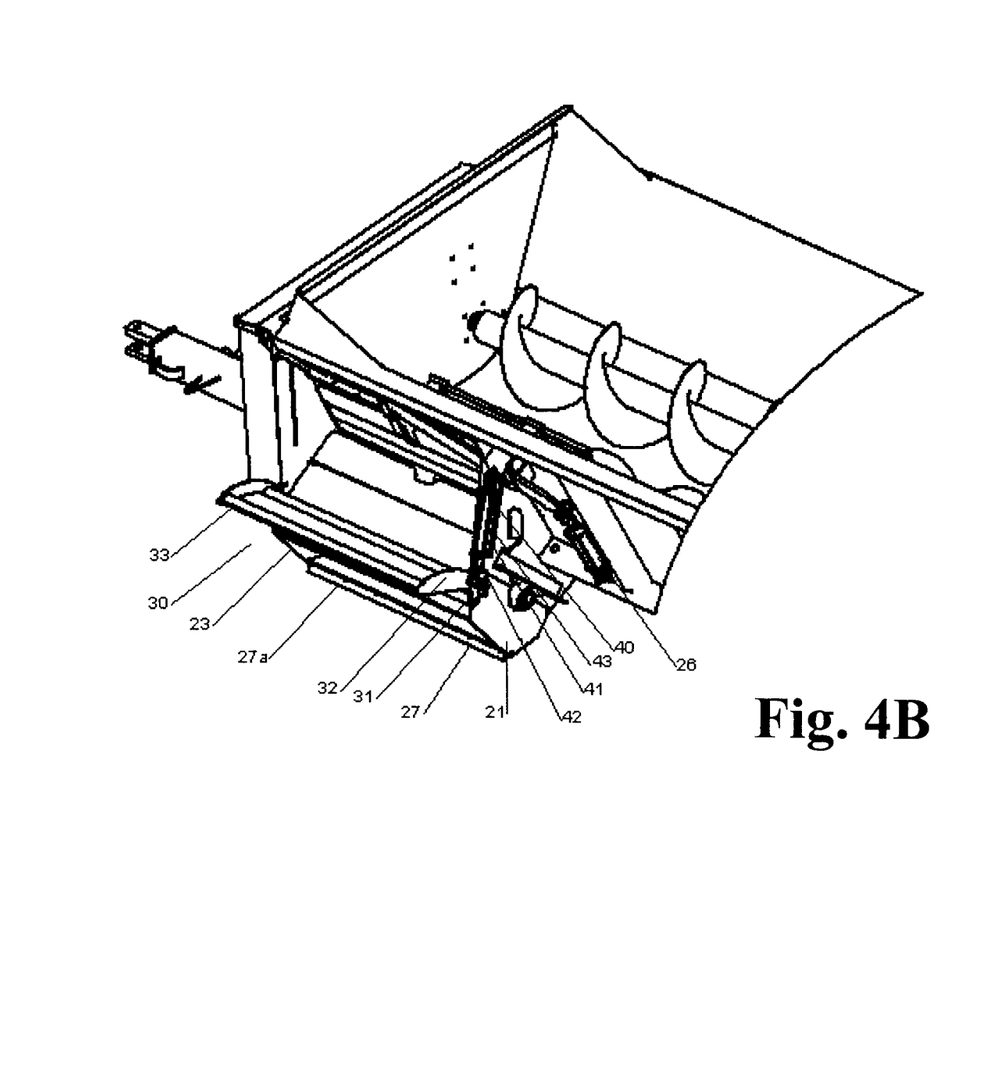
FIG. 4B is an isometric view of the spreader apparatus with the deflector door in a second position.

As shown in FIGS. 4A and 4B, the deflector door positioning device 40 positions the deflector door 30 between a first closed position and a second wide open position. In the closed position shown in FIG. 4A, the lip 33 of the deflector door 30 cooperates with the seal member 27 at the bottom of the discharge port to create a seal. When the deflector door 30 is in the closed position, material in the discharge unit 20 is substantially prevented from exiting through the discharge port 23, as the inner side 32c of the second portion 32 of the deflector door 30 abuts and substantially covers the discharge port 23. Furthermore, the lip 33 abuts the seal member 27 to form a seal. Thus, material may be substantially prevented from exiting the discharge unit 20 of spreader apparatus 1 while being transported. The hydraulic cylinder 41 may be fully extended when the deflector door 30 is in the closed position. Alternatively, the hydraulic cylinder 41 may extend up to a first mechanical stop when the deflector door is in the closed position.

As a width of the deflector door 30 may be greater than a width of the discharge port 23, the deflector door may completely cover the discharge port in the closed position. Thus, material may be completely prevented from exiting the discharge port.

In the wide open position shown in FIG. 4B, the deflector door 30 is positioned such that material that is discharged through the discharge port 23 does not impact the deflector door 30. The hydraulic cylinder 41 may be completely retracted when the deflector door is in the wide open position. Alternatively, the hydraulic cylinder 41 may retract up to a second mechanical stop when the deflector door is in the wide open position.

Figure 4C:
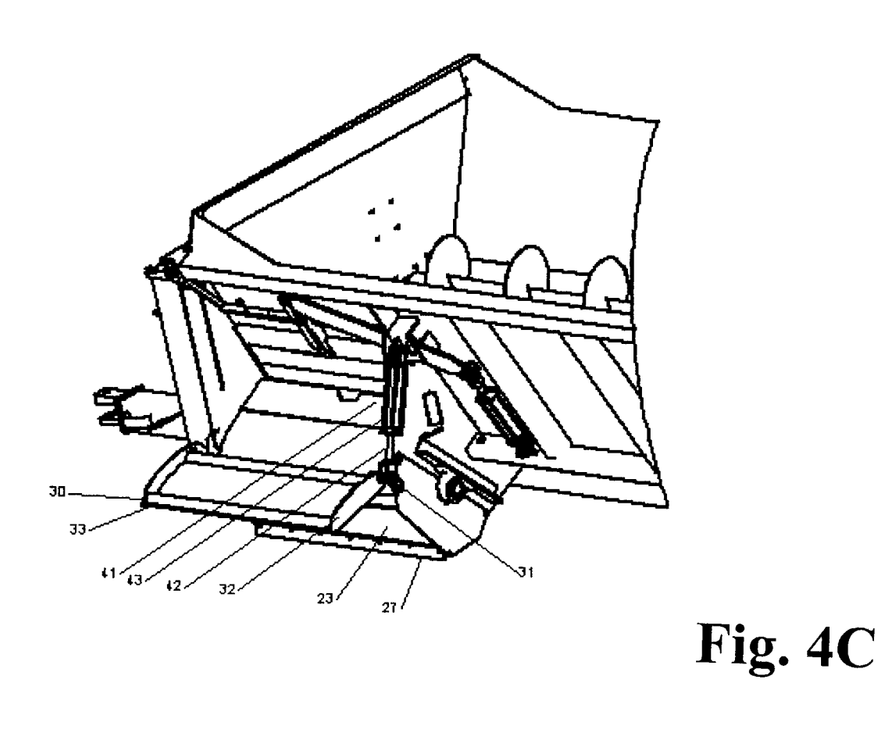
FIG. 4C is an isometric view of the spreader apparatus with the with the deflector door in a third position.

Moreover, as shown in FIG. 4C, the deflector door positioning device positions the deflector door 30 in a third position between the first closed position and the second wide open position. In fact, the deflector door positioning device 40 is typically able to position the deflector door 30 in any position between the first closed position and the second wide open position to control the distance that the material is discharged from the discharge port 23. For example, the hydraulic cylinder 41 may be positioned anywhere between the fully extended position and the completely retracted position. In other words, the deflector door 30 is infinitely positionable.

The material discharged out of the discharge port 23 impacts a portion of the inner side 32c of the second portion 32 of the deflector door 30 to reduce the distance that the material travels. The inner side 32c is sufficiently rigid to deflect the material discharged out of the discharge port 23. In other words, the trajectory of the material being discharged can be controlled based on the position of the deflector door 30. Thus, advantageously, the deposition distance and the deposition position of the discharged material can be controlled based on the position of the deflector door 30.

Figure 5A:
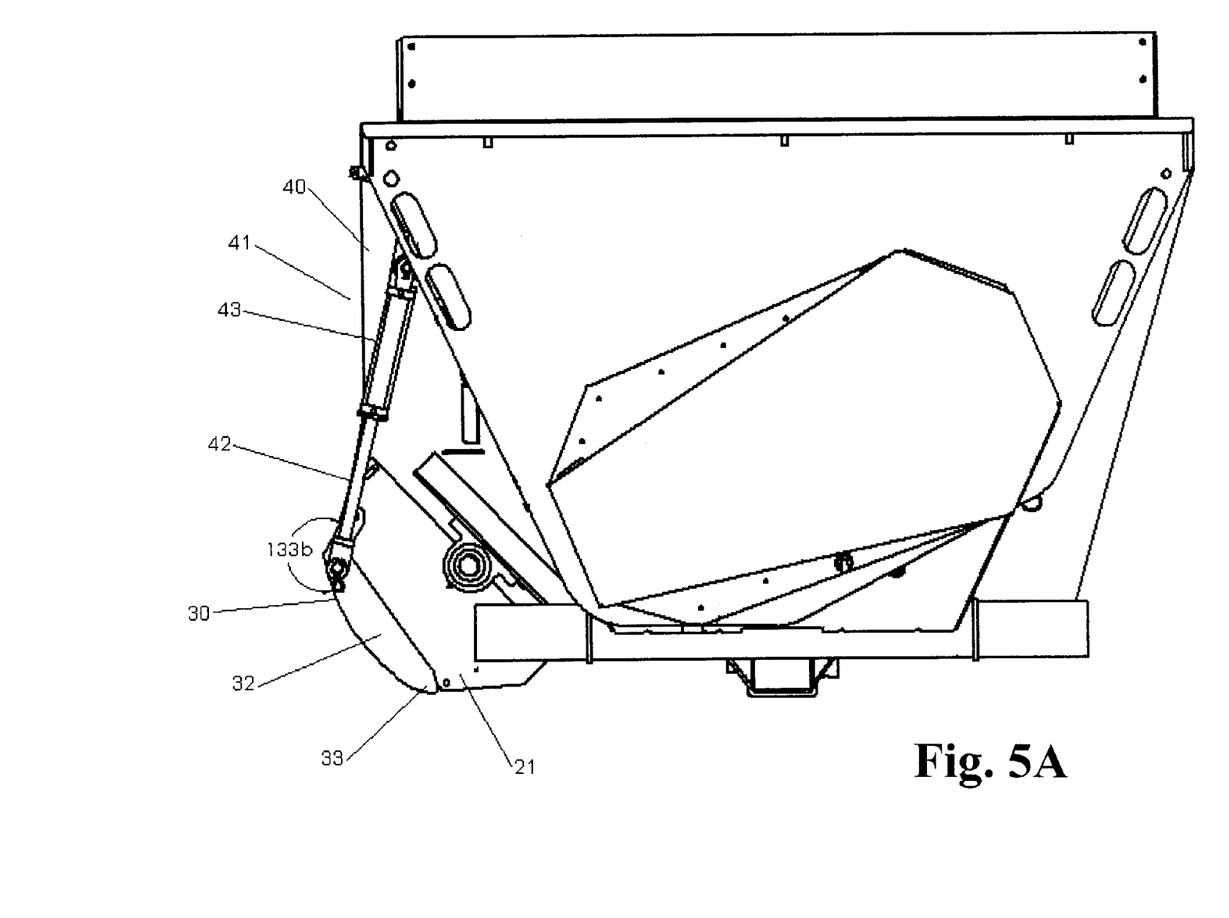
FIG. 5A is a front view of the spreader apparatus with the deflector door in the first position.
Figure 5B:
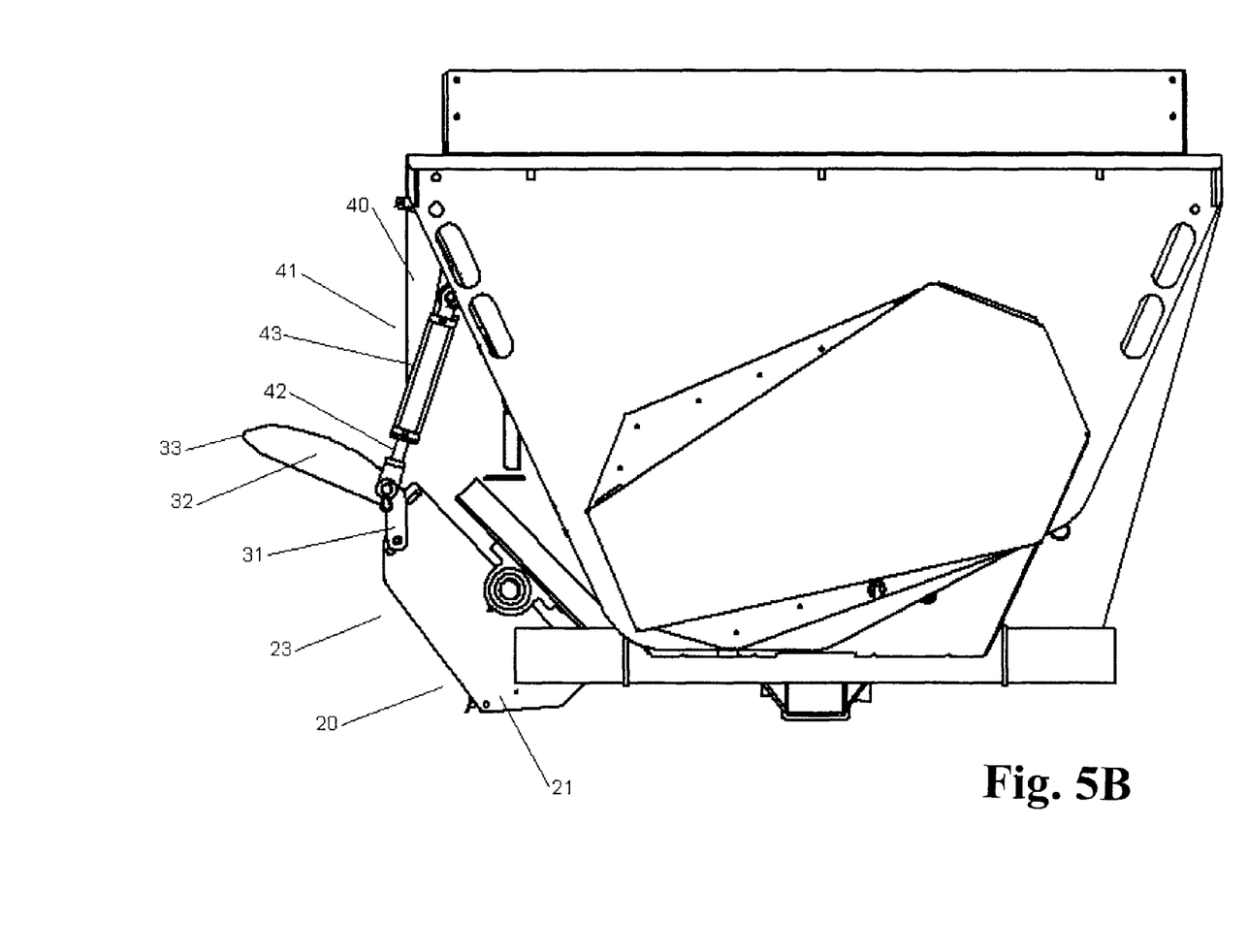
FIG. 5B is a front view of the spreader apparatus with the deflector door in a second position.
Figure 5C:
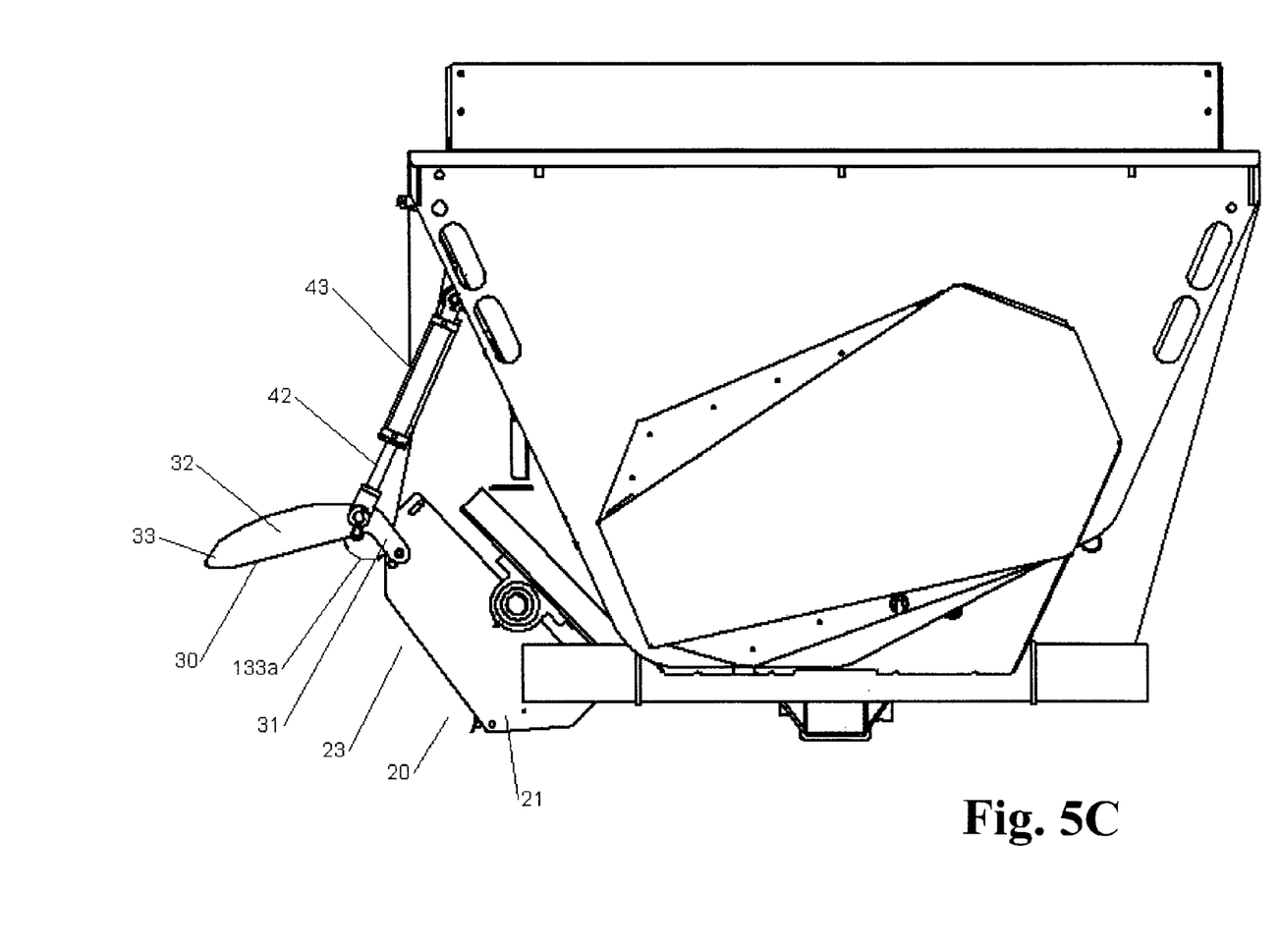
FIG. 5C is a front view of the spreader apparatus with the with the deflector door in a third position.

FIGS. 5A, 5B, and 5C show another view of the deflector door 30 in the first closed position, second wide open position, and third position between the closed position and wide open position, respectively.

One benefit of the present invention is that the distance and the deposition position of material discharged from a spreader apparatus may be easily and accurately controlled.

Another benefit of the present invention is that material clinging to the discharge unit does not exit the spreader apparatus when not in use, i.e., traveling, as material in the discharge unit 20 does not exit through the discharge port 23 when the deflector door 30 is in the closed position. Accordingly, the spreader apparatus may travel to a location where the material is to be spread, spread material by controlling the deposition distance and deposition position of the discharged material based on the position of the deflector door 30, place the deflector door 30 in the closed position so as to prevent material from exiting the discharge unit 20, and travel to another location without the material leaving the discharge unit 20.

Although only certain embodiments of this invention have been described in detail above, those skilled in the art will readily appreciate that many modifications are possible in the exemplary embodiment without materially departing from the novel teachings and advantages of this invention. Accordingly, all such modifications are intended to be included within the scope of this invention.

The invention claimed is:

1. A spreader apparatus for spreading material onto a target area, comprising:
    a container including an opening which receives therein the material and an outlet through which the material is discharged;
    a discharge unit disposed adjacent to the outlet which discharges the material onto the target area, the discharge unit including a housing with an inlet port and a discharge port;
    a primary door disposed in the discharge unit between the outlet of the container and the inlet port of the discharge unit;
    a deflector door disposed on the discharge port;
    a deflector door positioning device which positions the deflector door; and
    a controller configured to control the deflector door positioning device so that the deflector door pivots so as to be positioned at a first closed position, a second maximum open position or an intermediate position between the first closed position and the second maximum open position,
    wherein the deflector door substantially covers the discharge port when the deflector door is in the first position such that the material is substantially prevented from exiting through the discharge port.

2. The spreader apparatus as claimed in claim 1, wherein the deflector door includes a first portion and a second portion, a first end of the first portion is pivotably connected to the discharge port and a second end of the first portion is connected to a first end of the second portion of the deflector door such that the second portion extends from the second end of the first portion at a non-zero angle.

3. The spreader apparatus as claimed in claim 2, wherein a second end of the second portion of the deflector door, opposite the first end of the second portion of the deflector door, includes a lip which cooperates with a seal member on the discharge port to create a seal when the deflector door is in the first closed position.

4. The spreader apparatus as claimed in claim 3, wherein the lip of the deflector door is beveled.

5. The spreader apparatus as claimed in claim 1, wherein the deflector door positioning device is a linear actuator.

6. The spreader apparatus as claimed in claim 5, wherein the deflector door positioning device is a hydraulic cylinder.

7. The spreader apparatus as claimed in claim 6, wherein the hydraulic cylinder includes a piston, and a rod, and the rod is connected to the deflector door.

8. The spreader apparatus as claimed in claim 7, wherein the deflector door is in the first closed position when the hydraulic cylinder is extended and the deflector door is in the second maximum open position when the hydraulic cylinder is retracted.

9. The spreader apparatus as claimed in claim 8, wherein another hydraulic cylinder actuates the primary door between an open and closed position.

10. The spreader apparatus as claimed in claim 1, wherein the controller is configured to control a distance that the material discharged from the discharge port is deflected by the deflector door when the deflector door is positioned between the first position and the second position.

11. The spreader apparatus as claimed in claim 1, wherein the discharge unit includes a discharging device disposed inside the housing which discharges the material through the discharge port.

12. The spreader apparatus as claimed in claim 1, wherein the deflector door completely covers the discharge port when the deflector door is in the first position such that the material is prevented from exiting through the discharge port.

13. A method of spreading material, comprising:
    discharging material from a spreading apparatus;
    deflecting the discharged material with a pivotable deflector door such that a distance that the material is discharged from the spreading apparatus is based on a position of the pivoted deflector door; and covering a discharge port of the spreader apparatus by pivoting the deflector door such that material is substantially prevented from exiting through the discharge port, wherein the spreading apparatus comprises:

a container including an opening which receives therein the material and an outlet through which the material is discharged, a discharge unit disposed adjacent to the outlet which discharges the material onto the target area, the discharge unit including a housing with an inlet port and a discharge port, and a primary door disposed in the discharge unit between the outlet of the container and the inlet port of the discharge unit, and wherein the material is discharged by the discharge unit and an amount of material that enters the discharge unit is controlled by a position of the primary door.

14. The method according to claim 13, wherein a lip of the deflector door cooperates with a seal member on the discharge port to create a seal when the deflector door covers the discharge port.

15. The method according to claim 13, wherein the deflector door includes a first portion and a second portion, a first end of the first portion is pivotably connected to the discharge port and a second end of the first portion is connected to a first end of the second portion of the deflector door such that the second portion extends from the second end of the first portion at a non-zero angle.

* * * * *

UNITED STATES PATENT AND TRADEMARK OFFICE
CERTIFICATE OF CORRECTION

PATENT NO. : 8,870,101 B2  
APPLICATION NO. : 12/892430  
DATED : October 28, 2014  
INVENTOR(S) : Gibson et al.

Page 1 of 1

It is certified that error appears in the above-identified patent and that said Letters Patent is hereby corrected as shown below:

In the Specification

Col. 2, line 67, after "the" delete "with the"; and

Col. 3, line 5, after "apparatus" delete "with the".

Signed and Sealed this
Twenty-third Day of June, 2015

Michelle K. Lee
*Director of the United States Patent and Trademark Office*